United States Patent
Gu

(10) Patent No.: US 10,841,229 B2
(45) Date of Patent: Nov. 17, 2020

(54) PROCESSING METHOD, SYSTEM, PHYSICAL DEVICE AND STORAGE MEDIUM BASED ON DISTRIBUTED STREAM COMPUTING

(71) Applicant: Tencent Technology (Shenzhen) Company Limited, Shenzhen (CN)

(72) Inventor: Lele Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/296,056

(22) Filed: Mar. 7, 2019

(65) Prior Publication Data

US 2019/0207861 A1    Jul. 4, 2019

Related U.S. Application Data

(63) Continuation of application No. PCT/CN2017/106947, filed on Oct. 19, 2017.

(30) Foreign Application Priority Data

Nov. 18, 2016    (CN) .......................... 2016 1 1041838

(51) Int. Cl.
G06F 15/173    (2006.01)
H04L 12/825    (2013.01)
(Continued)

(52) U.S. Cl.
CPC .............. *H04L 47/25* (2013.01); *G06F 9/46* (2013.01); *G06F 9/465* (2013.01); *G06F 9/50* (2013.01);
(Continued)

(58) Field of Classification Search
CPC ....... H04L 47/25; H04L 47/11; H04L 47/125; H04L 43/16; H04L 43/0876;
(Continued)

(56) References Cited

U.S. PATENT DOCUMENTS 5,555,244 A *   9/1996   Gupta ............... H04N 21/64707
                                                             348/E7.069
7,106,696 B1 *  9/2006   Lim .......................... G06F 5/06
                                                             370/230.1
(Continued)

FOREIGN PATENT DOCUMENTS

CN    104298556 A    1/2015
CN    104899079 A    9/2015
(Continued)

OTHER PUBLICATIONS

Tencent Technology, ISRWO, PCT/CN2017/106947, dated Jan. 22, 2018, 6 pgs.

(Continued)

*Primary Examiner* — Richard G Keehn
(74) *Attorney, Agent, or Firm* — Morgan, Lewis & Bockius LLP

(57) ABSTRACT

A processing method based on distributed stream computing is performed by a computing device. After receiving flow data sent by an upstream computing node, the computing device stores the flow data into a flow data pool. The computing device collects a data ratio of the flow data in the flow data pool to a total capacity of the flow data pool. When the collected data ratio is greater than or equal to a first threshold, the computing device performs an operation of adding a mark for enabling the upstream computing node to decrease a flow data sending rate; when the collected data ratio is less than or equal to a second threshold, the second threshold being less than the first threshold, the computing device performs an operation of deleting the mark for
(Continued)

enabling the upstream computing node to increase the flow data sending rate.

17 Claims, 9 Drawing Sheets

(51) Int. Cl.
| | |
|---|---|
| *H04L 12/26* | (2006.01) |
| *H04L 12/801* | (2013.01) |
| *H04L 12/803* | (2013.01) |
| *H04L 12/931* | (2013.01) |
| *G06F 9/50* | (2006.01) |
| *G06F 9/46* | (2006.01) |
| *G06F 9/54* | (2006.01) |

(52) U.S. Cl.
CPC ............ *G06F 9/5083* (2013.01); *G06F 9/542* (2013.01); *H04L 43/16* (2013.01); *H04L 47/11* (2013.01); *H04L 47/125* (2013.01); *H04L 49/506* (2013.01); *H04L 43/0876* (2013.01)

(58) Field of Classification Search
CPC . H04L 49/506; G06F 9/50; G06F 9/46; G06F 9/542; G06F 9/465; G06F 9/5083
See application file for complete search history.

(56) References Cited

U.S. PATENT DOCUMENTS

| | | | |
|---|---|---|---|
| 7,558,859 B2 | 7/2009 | Kasiolas et al. | |
| 7,743,183 B2* | 6/2010 | Virdi | H04N 21/44004 709/234 |
| 8,621,074 B2* | 12/2013 | Shikari | G06F 9/546 709/224 |
| 2008/0310432 A1* | 12/2008 | Ranjan | H04L 47/10 370/401 |
| 2011/0142064 A1* | 6/2011 | Dubal | H04L 47/125 370/412 |
| 2011/0255403 A1* | 10/2011 | Papirakis | H04L 47/25 370/230.1 |
| 2012/0066688 A1* | 3/2012 | Chiang | G06F 9/5083 718/105 |
| 2013/0242727 A1* | 9/2013 | Shaikh | H04L 47/22 370/230 |
| 2014/0269276 A1* | 9/2014 | Rothstein | H04L 43/0894 370/230 |
| 2014/0376624 A1* | 12/2014 | Li | H04N 19/159 375/240.12 |
| 2017/0163537 A1* | 6/2017 | Peterson | H04L 47/125 |
| 2018/0097738 A1* | 4/2018 | Torres | H04B 7/18513 |
| 2018/0136981 A1* | 5/2018 | Clayton | G06F 9/5083 |
| 2018/0152388 A1* | 5/2018 | Thorsen | H04L 49/90 |
| 2019/0104079 A1* | 4/2019 | Wang | H04L 47/34 |

FOREIGN PATENT DOCUMENTS

| | | |
|---|---|---|
| CN | 104978232 A | 10/2015 |
| CN | 105930203 A | 9/2016 |
| CN | 106326008 A | 1/2017 |

OTHER PUBLICATIONS

Tencent Technology, IPRP, PCT/CN2017/106947, dated May 21, 2019, 5 pgs.

\* cited by examiner

PROCESSING METHOD, SYSTEM, PHYSICAL DEVICE AND STORAGE MEDIUM BASED ON DISTRIBUTED STREAM COMPUTING

CROSS-REFERENCE TO RELATED APPLICATIONS

This application is a continuation application of PCT/CN2017/106947, entitled "DISTRIBUTED STREAM CALCULATION-BASED PROCESSING METHOD, SYSTEM, PHYSICAL EQUIPMENT AND STORAGE MEDIUM" filed on Oct. 19, 2017, which claims priority to Chinese Patent Application No. 201611041838.0, entitled "BACK PRESSURE PROCESSING METHOD AND SYSTEM BASE ON DISTRIBUTED STREAM COMPUTING" filed with the Chinese Patent Office on Nov. 18, 2016, all of which are incorporated by reference in their entirety.

FIELD OF THE TECHNOLOGY

This application relates to the field of distributed stream computing technologies, and in particular, to a processing method based on distributed stream computing, a system, a computing device, and a storage medium.

BACKGROUND OF THE DISCLOSURE

Stream computing or streaming computing is an efficient data processing method, in which data is generated and transmitted in the form of streams, and does not need to be stored into a persistent medium such as a magnetic disk. The data is computed by a data consumer soon after being generated. The stream computing is generally used for a latency-sensitive computing task. A distributed stream computing system is a system used for performing a stream computing task, and the distributed stream computing system includes multiple levels of computing nodes. Flow data required by the stream computing flows through all levels of computing nodes level by level and the stream computing is performed on the flow data by the computing nodes through which the flow data flows, where one computing node or a plurality of parallel computing nodes may be included at each level.

However, currently, a distributed stream computing system has a back pressure problem, and the back pressure problem means that a rate of receiving data by the distributed stream computing system is higher than a rate of processing data by the distributed stream computing system within an instantaneous pulse. If the back pressure problem cannot be resolved in time, resources may be exhausted or even a data loss may be caused. Currently, the back pressure problem is resolved mainly by instructing a data source to temporarily shut down data streams when the data pressure reaches a certain level. This affects all computing nodes engaging in distributed stream computing and affects the efficiency of the distributed stream computing.

SUMMARY

According to various embodiments of this application, a processing method based on distributed stream computing, a system, a computing device, and a storage medium are provided.

A first aspect of the present application provides a processing method based on distributed stream computing performed on a computing device having one or more processors and memory storing a plurality of programs to be executed by the one or more processors, the method comprising:

receiving flow data sent by an upstream computing node;

storing the flow data into a flow data pool, flow data in the flow data pool being consumed when stream computing is locally performed on the flow data in the flow data pool;

collecting a data ratio of the flow data in the flow data pool to a total capacity of the flow data pool;

performing an operation of adding a mark, and increasing a first threshold, if the collected data ratio is greater than or equal to the first threshold, the operation of adding the mark being used for enabling the upstream computing node to decrease a flow data sending rate; and performing an operation of deleting the mark, and decreasing the first threshold, if the collected data ratio is less than or equal to a second threshold, the second threshold being less than the first threshold, and the operation of deleting the mark being used for enabling the upstream computing node to increase the flow data sending rate.

A second aspect of the present application provides a computing device including one or more processors and memory, the memory storing a plurality of programs that, when executed by the one or more processors, cause the computing device to perform the aforementioned steps of the processing method based on distributed stream computing.

A third aspect of the present application provides a non-transitory computer readable storage medium stores a plurality of programs that, when executed by one or more processors of a computing device, cause the computing device to perform the aforementioned steps of the processing method based on distributed stream computing.

Details of one or more embodiments of this application are provided in the following accompanying drawings and descriptions. Other features and advantages of this application become more obvious with reference to the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

Figure 1:
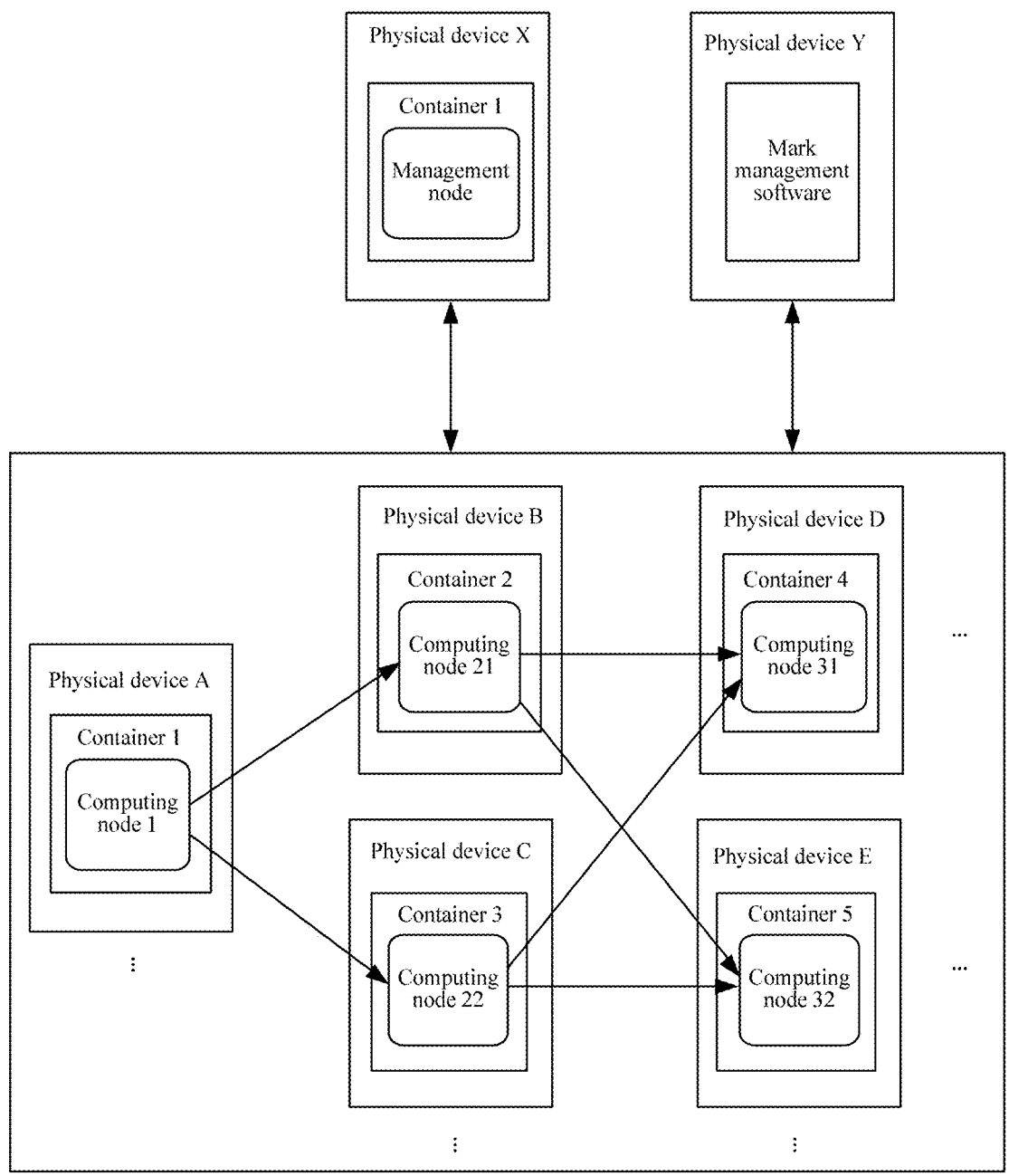
FIG. 1 is an application environment diagram of a distributed stream computing system according to an embodiment.

FIG. 1 is an application environment diagram of a distributed stream computing system according to an embodiment. Referring to FIG. 1, the distributed stream computing system includes several computing devices, one or more containers run on each computing device, and one or more computing nodes run in each container. The computing device may be a server, and the container may be a virtual machine, a process, or a thread. The container is configured to accommodate the computing node. The computing node is a unit for performing stream computing.

Flow data is input into the distributed stream computing system, flows through computing nodes in the distributed stream computing system level by level, and the stream computing is performed on the flow data by the computing nodes through which the flow data flows. Each level of computing nodes are parallel computing nodes, the parallel computing nodes may also be referred to as parallel computing nodes, and the parallel computing nodes have same computing logic. The parallel computing nodes may be located in different containers, or may exist in different computing devices.

Specifically, in FIG. 1, a computing node 21 and a computing node 22 are parallel computing nodes, and a computing node 31 and a computing node 32 are parallel computing nodes. Flow data flows from a computing node 1 to the computing node 21 and the computing node 22, flow data sent by the computing node 21 is sent to the computing node 31 and the computing node 32, flow data sent by the computing node 22 is sent to the computing node 31 and the computing node 32, and so on.

The distributed stream computing system may further include a computing device on which a management node runs, and the computing device on which the management node runs is configured to manage parallelism of each level of the computing nodes, thereby performing an operation of adding or deleting parallel computing nodes on each level of the computing nodes. The parallelism refers to the quantity of the parallel computing nodes. The distributed stream computing system may further include a computing device on which mark management software runs, and the computing device on which the mark management software runs is configured to record a mark of each computing node that is added or reduced. The mark management software may use ZooKeeper.

Figure 2:
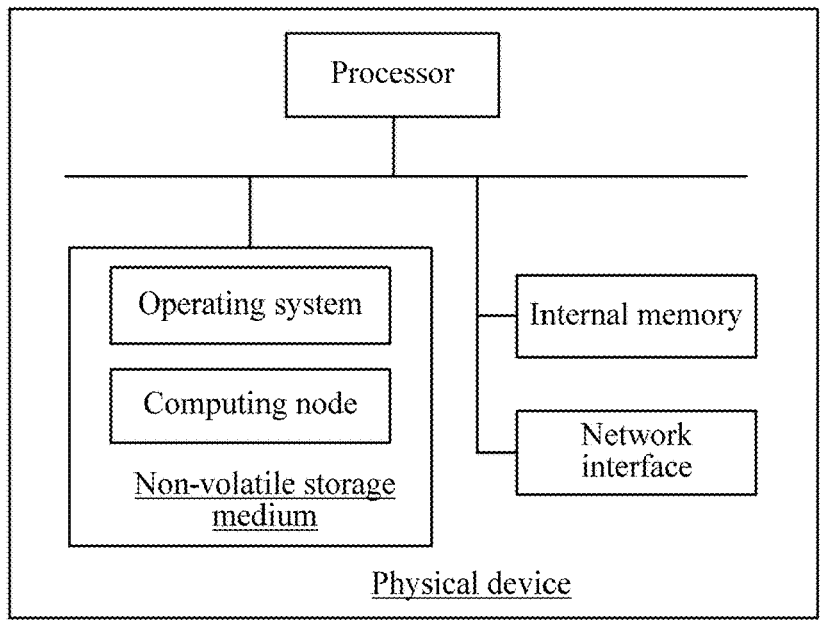
FIG. 2 is a structural block diagram of a computing device according to an embodiment.

FIG. 2 is a structural block diagram of a computing device according to an embodiment. Referring to FIG. 2, the computing device includes a processor, a non-volatile storage medium, an internal memory, and a network interface that are connected by using a system bus. The non-volatile storage medium of the computing device stores an operating system and a computing node, and the computing node is configured to perform a processing method based on distributed stream computing. The processor of the computing device is configured to provide a computing and control capability, and supports running of the entire computing device. The internal memory of the computing device provides an environment for running of the computing node in the non-volatile storage medium. The internal memory may store a computer readable instruction, and the computer readable instruction, when executed by the processor, may cause the processor to perform a processing method based on distributed stream computing. The network interface of the computing device is configured for network communication such as receiving and sending flow data. The computing device may be implemented by using an independent computing device or a computing device cluster including a plurality of computing devices. A person skilled in the art may understand that, the structure shown in FIG. 2 is only a block diagram of a partial structure related to a solution in this application is shown, and does not constitute a limitation to the computing device to which the solution in this application is applied. Specifically, the computing device may include more components or fewer components than those shown in the figure, or some components may be combined, or a different component deployment may be used.

Figure 3:
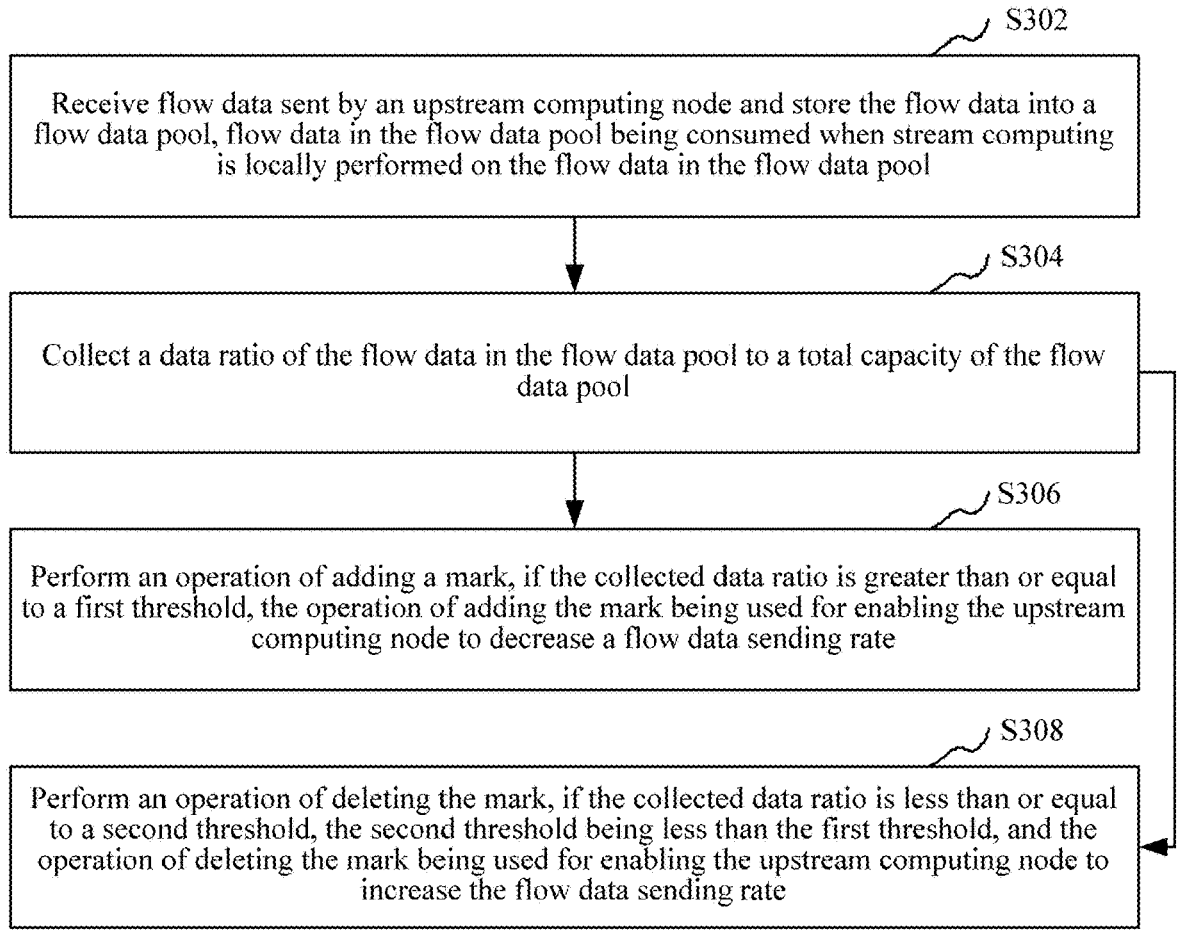
FIG. 3 is a schematic flowchart of a processing method based on distributed stream computing according to an embodiment.

FIG. 3 is a schematic flowchart of a processing method based on distributed stream computing according to an embodiment. An example in which the method is applied to a computing node in the computing device in FIG. 1 is used for describing this embodiment. The following uses a current computing node as an example for describing the used computing node. Referring to FIG. 3, the processing method based on distributed stream computing specifically includes the following steps:

S302: Receive flow data sent by an upstream computing node and store the flow data into a flow data pool, flow data in the flow data pool being consumed when stream computing is locally performed on the flow data in the flow data pool.

The upstream computing node refers to a computing node that sends the flow data to the current computing node, and the upstream computing node of the current computing node may be one computing node or a plurality of parallel computing nodes. The flow data pool of the current computing node is used for storing the flow data from the upstream computing node and providing flow data required for performing stream computing by the current computing node. The flow data pool of the current computing node constantly stores the received flow data, and constantly consumes the flow data in the flow data pool when the stream computing is performed. A back pressure problem occurs when the flow data pool is not enough to store the received flow data. The flow data pool may be a flow data queue. The current computing node may perform step S304 each time addition and/or consumption of the flow data is generated in the flow data pool.

S304: Collect a data ratio of the flow data in the flow data pool to a total capacity of the flow data pool.

The flow data in the flow data pool refers to flow data that is received from the upstream computing node and is not consumed in the flow data pool. The total capacity of the flow data pool refers to a maximum data volume of flow data that can be accommodated by the flow data pool. The data ratio may be equal to the flow data in the flow data pool divided by the total capacity. The data ratio may be referred to as a watermark.

S306: Perform an operation of adding a mark, if the collected data ratio is greater than or equal to a first threshold, the operation of adding the mark being used for enabling the upstream computing node to decrease a flow data sending rate.

The first threshold is a determining threshold for determining whether the data ratio results in the back pressure problem. The first threshold may be referred to as a high water level. The mark is used for marking that the current computing node has a condition resulting in the back pressure problem. The flow data sending rate refers to a data volume of flow data sent in unit time. The flow data sending rate may be represented by a rate coefficient, and the rate coefficient represents a multiple relationship between the used rate and a maximum rate. For example, when the rate coefficient is 1, it represents that the flow data is sent at a maximum rate; and when the rate coefficient is 0.5, it represents that the flow data is sent at a rate that is half of the maximum rate.

Specifically, after collecting the data ratio of the flow data pool corresponding to the current computing node, the current computing node compares the data ratio with the first threshold. If the data ratio is greater than or equal to the first threshold, the mark corresponding to the current computing node may be added in mark management software. If a mark is already added to the current computing node, the mark is maintained.

Further, the upstream computing node may periodically detect whether marks of downstream computing nodes (which include the foregoing current computing node) of the upstream computing node are already added. If yes, the flow data sending rate is decreased. Specifically, the flow data sending rate may be decreased based on a specified step. If the flow data sending rate is represented by using the rate coefficient, the specified step may be 0.1. Another computing node parallel to the current computing node may also perform the operation of adding the mark. The current computing node may also actively inform the upstream computing node when performing the operation of adding the mark.

S308: Perform an operation of deleting the mark, if the collected data ratio is less than or equal to a second threshold, the second threshold being less than the first threshold, and the operation of deleting the mark being used for enabling the upstream computing node to increase the flow data sending rate.

The second threshold is a determining threshold for determining whether the data ratio results in an idle resource. The second threshold is less than the first threshold. Relative to the first threshold referred to as the high water level, the second threshold may be referred to as a low water level.

Specifically, if the data ratio is less than the first threshold, the current computing node may further compare the data ratio with the second threshold. If the data ratio is greater than the second threshold, the operation may be ended directly, and collecting of a data ratio next time is waited. If the data ratio is less than or equal to the second threshold, the operation of deleting the mark is performed. Specifically, the operation of deleting the mark may be performed when the mark corresponding to the current computing node exists, and if the mark corresponding to the current computing node does not exist, the mark is maintained.

Further, the upstream computing node may periodically detect whether the marks of the downstream computing nodes (which include the foregoing current computing node) of the upstream computing node are already deleted. If yes, the flow data sending rate is increased. Specifically, the flow data sending rate may be increased based on a specified step. If the flow data sending rate is represented by using the rate coefficient, the specified step may be 0.1. Another computing node parallel to the current computing node may also perform the operation of deleting the mark, so that the flow data sending rate of the upstream computing node is further increased. The current computing node may also actively inform the upstream computing node when performing the operation of deleting the mark.

The processing method based on distributed stream computing uses the relatively high first threshold and the relatively low second threshold, when the data ratio is greater than or equal to the first threshold, it indicates that the back pressure problem may be caused, and in this case, the operation of adding the mark is performed, so that the upstream computing node decreases the flow data sending rate, thereby relieving data pressure. When the data ratio is less than or equal to the second threshold, it indicates that current data pressure is small, the possibility of generating the back pressure problem is quite small, and the operation of deleting the mark is performed, so that the upstream computing node increases the flow data sending rate, thereby improving the efficiency of the stream computing.

Further, if each computing node during distributed stream computing performs the processing method based on distributed stream computing, back pressure processing of the computing nodes can be implemented level by level, thereby implementing back pressure processing for the entire distributed stream computing system.

In an embodiment, the processing method based on distributed stream computing further includes: increasing the first threshold if the collected data ratio is greater than or equal to the first threshold; and decreasing the first threshold if the collected data ratio is less than or equal to the second threshold.

Specifically, the current computing node compares the data ratio with the first threshold, and if the data ratio is greater than or equal to the first threshold, the operation of adding the mark corresponding to the current computing node may be performed, and the first threshold is increased. Specifically, the first threshold may be increased based on a first adjustment step. If the data ratio is less than the first threshold, the current computing node may further compare the data ratio with the second threshold. If the data ratio is less than or equal to the second threshold, the operation of deleting the mark is performed, and the first threshold is decreased. Specifically, the first threshold may be decreased based on a second adjustment step. The first adjustment step and the second adjustment step may be equal or not equal. In an embodiment, when the first threshold is increased or decreased, the first threshold is adjusted in an adjustment range of the first threshold.

In this embodiment, the first threshold uses a dynamic value to adapt to a natural fluctuation of flow data, and the first threshold is increased when the data ratio is greater than or equal to the first threshold to decrease a probability that the data ratio reaches the first threshold later. By increasing and decreasing the first threshold, a data rush hour can be dealt with, a layer of cushion is increased for generation of the back pressure problem, the operation is allowed under a relatively high first threshold and relatively large data pressure in the data rush hour, and a large quantity of computing nodes are prevented from generating the back pressure problem in the data rush hour to reduce time validity of the stream computing.

In an embodiment, the processing method based on distributed stream computing further includes: synchronously increasing the second threshold when the first threshold is increased; and synchronously decreasing the second threshold when the first threshold is decreased.

Specifically, when the first threshold needs to be increased or decreased, the first threshold and the second threshold are synchronously adjusted. The synchronous adjustment means that the first threshold and the second threshold are adjusted toward a same direction. In an embodiment, when the first threshold is increased or decreased, a difference between the first threshold and the second threshold is maintained fixed. In an embodiment, the first threshold and the second threshold each correspondingly have an adjustment range. When the current computing node synchronously adjusts the first threshold and the second threshold, the first threshold and the second threshold are synchronously adjusted in the adjustment ranges respectively corresponding to the first threshold and the second threshold.

For example, it is assumed that an initial value of the first threshold that is configured in advance is 0.7, an adjustment range is [0.6~0.9], and an adjustment step is 0.1; and an initial value of the second threshold is 0.2, an adjustment range is [0.1~0.4], and an adjustment step is 0.1. Then, when the data ratio is ≤0.2, a resource is idle, the first threshold and the second threshold are synchronously decreased by 0.1, the first threshold becomes 0.6, the second threshold becomes 0.1, and the operation of deleting the mark is performed. When the data ratio is ≥0.7, the resource is in short supply, the first threshold and the second threshold are synchronously increased by 0.1, the first threshold becomes 0.8, and the second threshold becomes 0.3. In this embodiment, no matter how to adjust the first threshold and the second threshold, the first threshold maintains in the range of [0.6~0.9], and the second threshold maintains in the range of [0.1~0.4].

In this embodiment, the first threshold and the second threshold are synchronously adjusted, and the first threshold and the second threshold are increased when the data ratio is greater than or equal to the first threshold, to decrease a probability that the data ratio is greater than or equal to the first threshold later; and the first threshold and the second threshold are decreased when the data ratio is less than or equal to the second threshold, to decrease a probability that the data ratio is less than or equal to the second threshold later. The operation is allowed under the relatively large data pressure in the data rush hour, the efficiency of the stream computing in the data rush hour is ensured; and the first threshold and the second threshold can be adjusted backwards in time when the data rush hour transitions to a normal state, to adaptively adjust a back pressure processing policy under different data pressure.

In an embodiment, step S306 specifically includes: increasing the first threshold, resetting a time ratio of the data ratio greater than or equal to the first threshold in a fixed time period, and performing the operation of adding the mark, if the collected data ratio is greater than or equal to the first threshold, and the time ratio is greater than or equal to a preset ratio; and performing the operation of adding the mark, if the collected data ratio is greater than or equal to the first threshold, and the time ratio of the data ratio greater than or equal to the first threshold in the fixed time period is less than the preset ratio.

In this embodiment, when the time ratio of the data ratio greater than or equal to the first threshold in the fixed time period is greater than or equal to the preset ratio, it indicates that the current computing node has relatively large data pressure in the time period as a whole, and the data rush hour may be accurately determined, thereby adjusting the first threshold to adapt to the data rush hour and resetting the time ratio to prepare for next determining. When the time ratio of the data ratio greater than or equal to the first threshold in the fixed time period is less than the preset ratio, it indicates that data pressure in the time period as a whole is not quite large, only the operation of adding the mark is performed, and the first threshold does not need to be adjusted.

In an embodiment, step S308 specifically includes: decreasing the first threshold, resetting the time ratio, and performing the operation of deleting the mark, if the collected data ratio is less than or equal to the second threshold, and the first threshold is already increased; and performing the operation of deleting the mark, if the collected data ratio is less than or equal to the second threshold, and the first threshold is not increased.

In this embodiment, when the collected data ratio is less than or equal to the second threshold, data pressure is relatively small, and the operation of deleting the mark needs to be performed. If the first threshold is already increased, the first threshold needs to be decreased to adapt a case in which the data pressure is relatively small; and if the first threshold is not increased, the first threshold is maintained to prevent the efficiency of stream computing from being affected due to an excessively low first threshold. The first threshold is decreased, the time ratio needs to be reset, and the time ratio of the data ratio greater than or equal to the first threshold in the fixed time period is re-collected.

Figure 4:
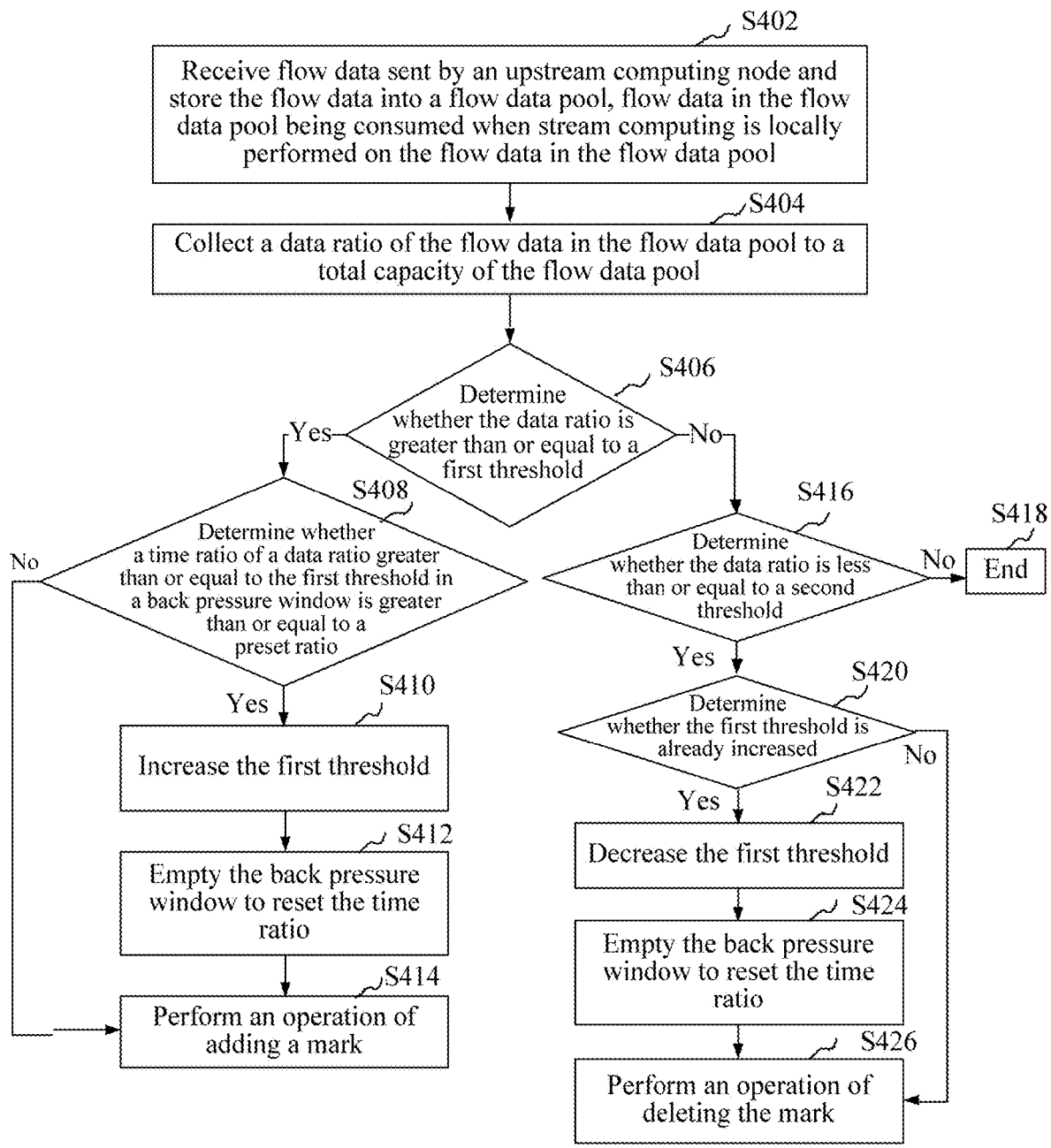
FIG. 4 is a schematic flowchart of a processing method based on distributed stream computing according to an embodiment.

FIG. 4 is a schematic flowchart of a processing method based on distributed stream computing according to an embodiment. Referring to FIG. 4, the method specifically includes the following steps:

S402: Receive flow data sent by an upstream computing node and store the flow data into a flow data pool, flow data in the flow data pool being consumed when stream computing is locally performed on the flow data in the flow data pool.

S404: Collect a data ratio of the flow data in the flow data pool to a total capacity of the flow data pool.

Specifically, a current computing node may collect the data ratio of the flow data in the flow data pool to the total capacity of the flow data pool each time the flow data pool changes, for example, each time the current computing node receives the flow data or the flow data in the flow data pool is consumed.

S406: Determine whether the data ratio is greater than or equal to a first threshold. If yes, step S408 is performed; and if not, step S416 is performed.

Specifically, the current computing node may compare the data ratio with the first threshold. If it is determined that the data ratio is greater than or equal to the first threshold, step S408 is performed; and if it is determined that the data ratio is less than the first threshold, step S416 is performed.

S408: Determine whether a time ratio of a data ratio greater than or equal to the first threshold in a back pressure window is greater than or equal to a preset ratio; if yes, step S410 is performed; and if not, step S414 is performed. The back pressure window is a fixed time period.

The back pressure window is a fixed time period, specifically, a fixed time period using current time as a upper limit. The current computing node may collect a time ratio of time during which the data ratio is greater than or equal to the first threshold to the time period in the back pressure window. Specifically, the current computing node may perform even sampling in the back pressure window, thereby dividing times of being greater than or equal to the first threshold by total times of sampling to obtain the time ratio. The preset ratio is, for example, 0.5.

S410: Increase the first threshold.

Specifically, the current computing node increases the first threshold in an adjustment range of the first threshold based on a first adjustment step.

S412: Empty the back pressure window to reset the time ratio.

Specifically, the current computing node empties the back pressure window, and subsequently re-collects a time ratio of a data ratio greater than or equal to the first threshold in the back pressure window.

Figure 5:
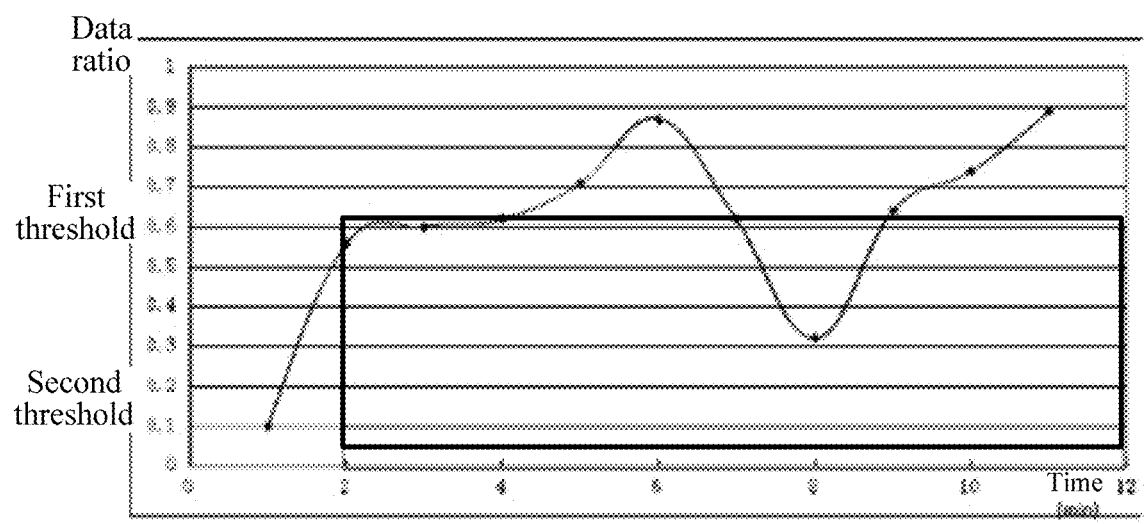
FIG. 5 is a schematic diagram of collecting a time ratio of a data ratio greater than or equal to a first threshold in a back pressure window according to an embodiment.

For example, referring to FIG. 5, it is assumed that the back pressure window is 10 min, and the preset ratio is 0.5. It may be obviously learned in FIG. 5 that time during which a data ratio (a water level) of the current node in last 10 min exceeds 0.6 exceeds 5 min, in this case, the first threshold (a high water level) is adjusted to 0.7, and the data ratio collected in the back pressure window is emptied to re-collect.

S414: Perform an operation of adding a mark.

S416: Determine whether the data ratio is less than or equal to a second threshold. If not, step S418 is performed; and if yes, step S420 is performed.

S418: End.

S420: Determine whether the first threshold is already increased. If yes, step S422 is performed; and if not, step S426 is performed.

Specifically, the current computing node may determine whether the first threshold is increased relative to a minimum value in the adjustment range of the first threshold.

S422: Decrease the first threshold.

S424: Empty the back pressure window to reset the time ratio.

S426: Perform an operation of deleting the mark.

In this embodiment, when the time ratio of the data ratio greater than or equal to the first threshold in the fixed time period is greater than or equal to the preset ratio, it indicates that the current computing node has relatively large data pressure in the time period as a whole, and the data rush hour may be accurately determined, thereby adjusting the first threshold to adapt to the data rush hour and resetting the time ratio to prepare for next determining.

When the time ratio of the data ratio greater than or equal to the first threshold in the fixed time period is less than the preset ratio, it indicates that data pressure in the time period as a whole is not quite large, only the operation of adding the mark is performed, and the first threshold does not need to be adjusted.

When the collected data ratio is less than or equal to the second threshold, data pressure is relatively small, and the operation of deleting the mark needs to be performed. If the first threshold is already increased, the first threshold needs to be decreased to adapt a case in which the data pressure is relatively small; and if the first threshold is not increased, the first threshold is maintained to prevent the efficiency of stream computing from being affected due to an excessively low first threshold. The first threshold is decreased, the time ratio needs to be reset, and the time ratio of the data ratio greater than or equal to the first threshold in the fixed time period is re-collected.

In an embodiment, the processing method based on distributed stream computing further includes: decreasing a current flow data sending rate of the upstream computing node by the upstream computing node if the flow data sending rate is greater than or equal to a preset value when performing the operation of adding the mark; and adding, when performing the operation of adding the mark, if the current flow data sending rate of the upstream computing node is less than the preset value, and if a quantity ratio of a computing node performing the operation of adding the mark to a current computing node and a computing node parallel to the current computing node reaches a preset ratio, the computing node parallel to the current computing node.

The preset value may be a positive value. To determine whether the current flow data sending rate of the upstream computing node is greater than or equal to the preset value, specifically, whether a current rate coefficient is greater than or equal to a preset rate coefficient may be determined. The preset ratio may be 0.5, or may be another value such as 0.6 based on a requirement. Specifically, if the current flow data sending rate of the upstream computing node is less than the preset value, and if the quantity ratio of the computing node performing the operation of adding the mark to the current computing node and the computing node parallel to the current computing node reaches the preset ratio, the current computing node may inform a management node, and parallelism of the current computing node is increased by the management node, thereby adding the parallel computing node for the current computing node.

Figure 6:
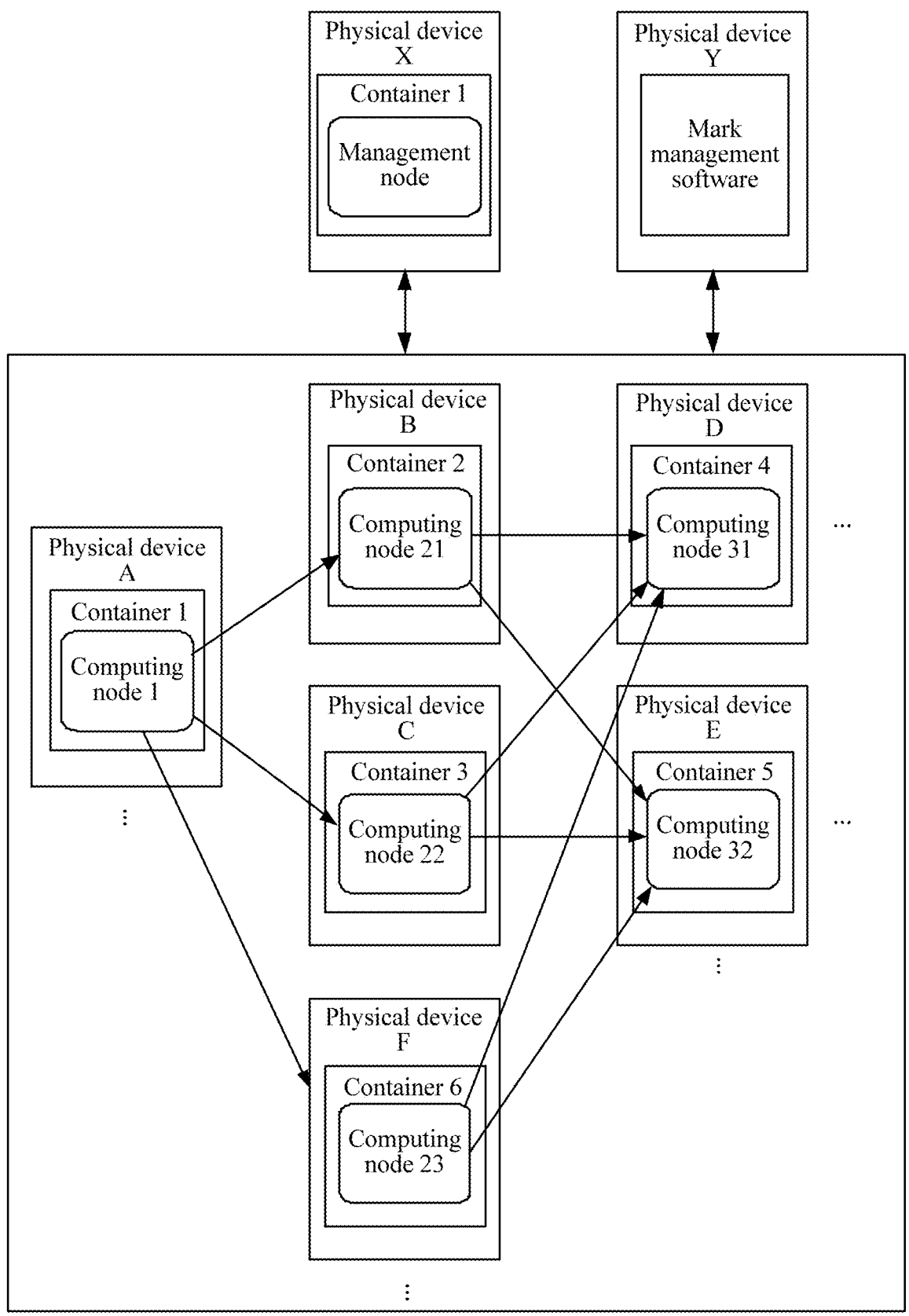
FIG. 6 is a schematic diagram of adding parallel computing nodes according to an embodiment.

For example, referring to FIG. 6, in the distributed stream computing system shown in FIG. 1, if a current flow data sending rate of the computing node 1 is less than the preset value, and marks are added to the computing node 21 and the computing node 22 that are parallel, a parallel computing node 23 may be added for the computing node 21 and the computing node 22.

In this embodiment, a lower limit is set for the flow data sending rate of the upstream computing node, the flow data sending rate is not decreased without limit. If the current flow data sending rate of the upstream computing node is greater than or equal to the preset value, data pressure of downstream computing nodes (that is, a set of parallel computing nodes including the current computing node) relative to the upstream computing node is quite large, and another manner needs to be used to increase a flow data processing capability of the downstream computing nodes. Specifically, the parallelism of the current computing node may be adjusted to add a computing node parallel to the current computing node.

Figure 7:
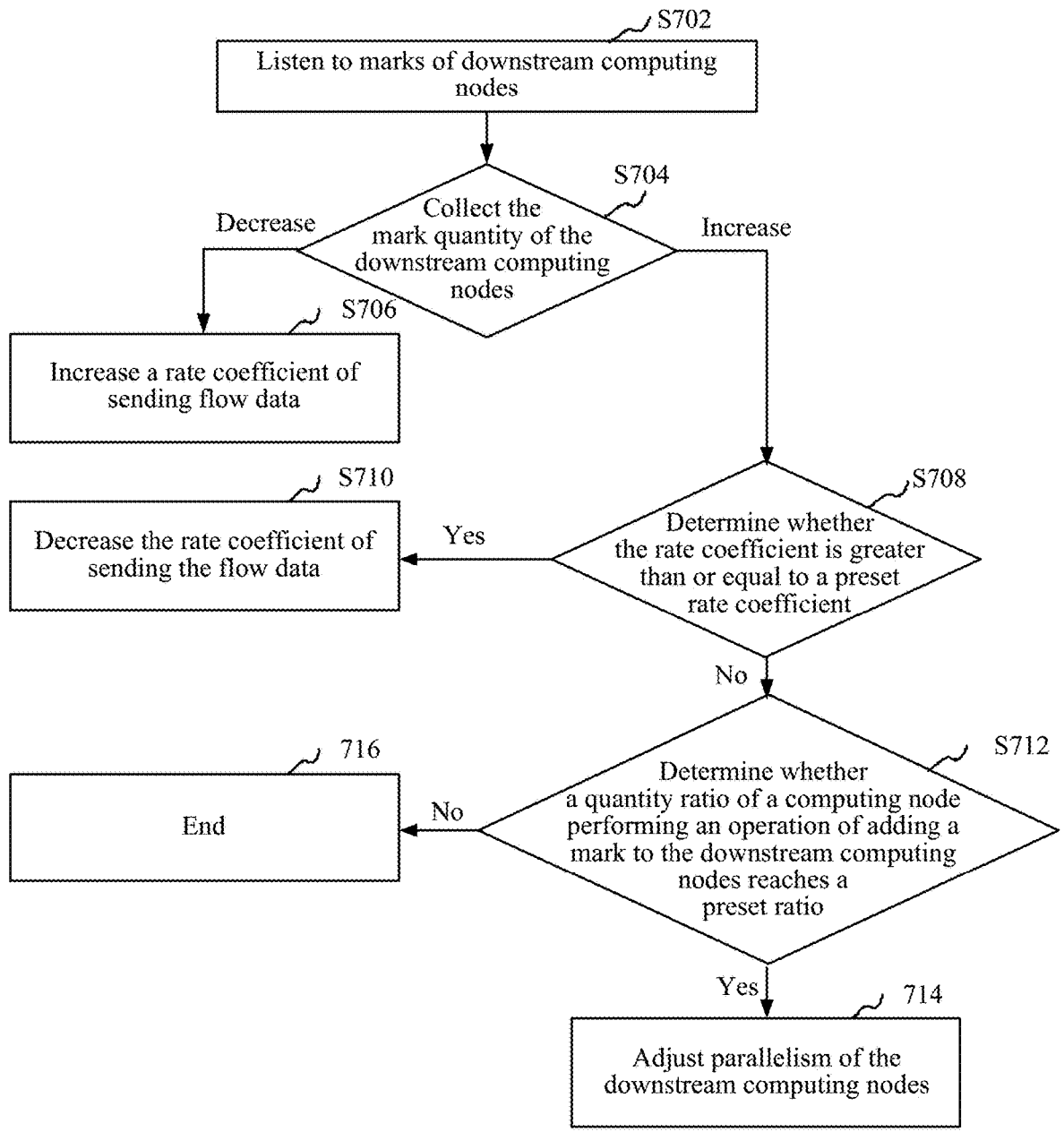
FIG. 7 is a schematic flowchart of steps of dynamically adjusting a local flow data sending rate based on a mark added to or deleted from downstream computing nodes according to an embodiment.

In an embodiment, the processing method based on distributed stream computing further includes steps of dynamically adjusting a local flow data sending rate based on a mark added to or deleted from downstream computing nodes. Referring to FIG. 7, the steps of dynamically adjusting a local flow data sending rate based on a mark added to or deleted from downstream computing nodes specifically include the following steps:

S702: Listen to the marks of the downstream computing nodes.

S704: Collect the mark quantity of the downstream computing nodes, perform step S706 if the mark quantity decreases; and perform step S708 if the mark quantity increases.

S706: Increase a rate coefficient of sending flow data. Specifically, the rate coefficient may be increased based on a specified step. For example, the rate coefficient is increased by 0.1 each time.

S708: Determine whether the rate coefficient is greater than or equal to the preset rate coefficient, if yes, perform step S710; and if not, perform step S712. The preset rate coefficient is, for example, 0.2.

S710: Decrease the rate coefficient of sending the flow data. Specifically, the rate coefficient may be decreased based on a specified step. For example, the rate coefficient is decreased by 0.1 each time.

S712: Determine whether the quantity ratio of the computing node performing the operation of adding the mark to the downstream computing nodes reaches the preset ratio, if yes, perform step S714; and if not, perform step S716.

Reaching the preset ratio means being greater than or equal to the preset ratio. The preset ratio is, for example, 0.5, and if the quantity of the downstream computing nodes is N, marks are added to 2/3N of the downstream computing nodes. Therefore, the quantity ratio of the nodes is 2/3 and reaches the preset ratio.

S714: Adjust parallelism of the downstream computing nodes.

S716: End.

In this embodiment, the rate coefficient is dynamically adjusted based on a change of the mark quantity of the downstream computing nodes, to flexibly adapt to the data pressure of the downstream computing nodes, and resolve the back pressure problem. In addition, a lower limit is set for the rate coefficient of sending the flow data, and when the rate coefficient decreases to an extent, the parallelism of the downstream computing nodes is adjusted to add a computing node parallel to the downstream computing nodes, so that normal stream computing can still be performed in the data rush hour.

In an embodiment, the processing method based on distributed stream computing further includes: increasing a flow data sending time interval by the upstream computing node when decreasing the flow data sending rate, the flow data sending time interval being in positive correlation with average time consumption for a single piece of flow data; and decreasing the flow data sending time interval by the upstream computing node when increasing the flow data sending rate.

The flow data sending time interval is waiting time between two continuous sending of the flow data by the upstream computing node. The flow data may be sent at an interval piece by piece, or may be sent at an interval in batches. The average time consumption for the single piece of flow data may be average time consumption of the single piece of flow data in the entire distributed stream computing system, or may be average time consumption of processing the single piece of flow data in the upstream computing node. A time period for collecting the average time consumption for the single piece of flow data may be one or more days. Increasing or decreasing the flow data sending time interval may be performed based on a preset step. The time interval may be a product of the rate coefficient and the average time consumption for the single piece of flow data.

For example, assuming that the upstream computing node processes 1000 pieces of flow data in 1 s, then the average time consumption of the single piece of flow data of the upstream computing node is 1 s/1000=1 ms. If the current computing node generates a mark, it indicates that when the upstream computing node sends 1000 pieces of flow data in 1 s, the current node has relatively large pressure, and the upstream computing node may decrease the rate coefficient by 0.1. If the rate coefficient is 0.5 after being decreased, the upstream computing node may be dormant for 0.5*1 ms=0.5 ms after sending a piece of flow data each time, or dormant for 100*0.5 ms=50 ms after sending 100 pieces of flow data each time.

In this embodiment, the upstream computing node increases the flow data sending time interval to decrease the flow data sending rate; and decreases the flow data sending time interval to increase the flow data sending rate. In addition, the flow data sending time interval is in positive correlation with the average time consumption for the single piece of flow data. In this way, precise control on the flow data sending rate can be implemented.

Figure 8:
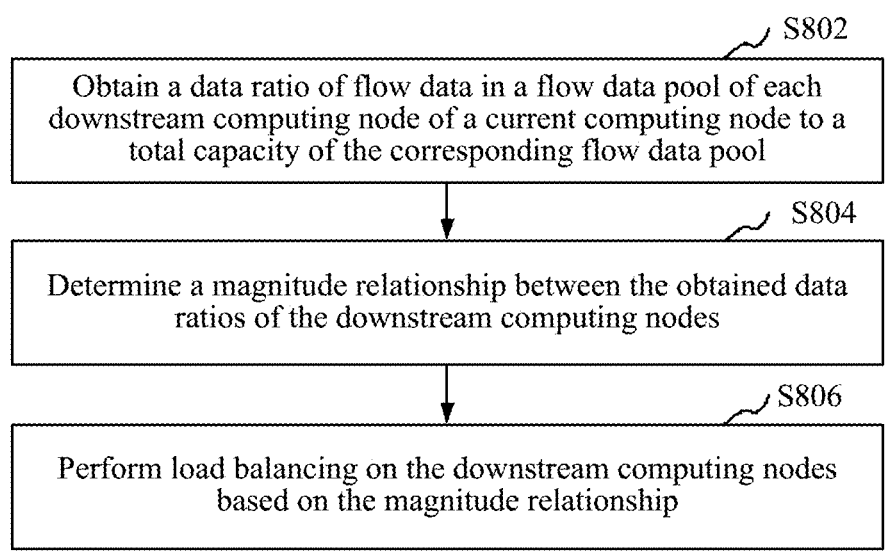
FIG. 8 is a schematic flowchart of steps of performing load balancing on downstream computing nodes according to an embodiment.

In an embodiment, the processing method based on distributed stream computing further includes steps of performing load balancing on the downstream computing nodes. Referring to FIG. 8, the steps of performing load balancing on the downstream computing nodes specifically include the following steps:

S802: Obtain a data ratio of flow data in a flow data pool of each downstream computing node of a current computing node to a total capacity of the corresponding flow data pool.

The downstream computing nodes refer to computing nodes to which flow data output by the current computing node is directly sent. The downstream computing nodes also perform the processing method based on distributed stream computing in the foregoing various embodiments. The current computing node may obtain the data ratio collected by the downstream computing nodes of the current computing node when the downstream computing nodes perform the processing method based on distributed stream computing, and the data ratio represents a ratio of the flow data in the flow data pool corresponding to each downstream computing node to the total capacity of the corresponding flow data pool. S802 may be periodically performed.

S804: Determine a magnitude relationship between the obtained data ratios of the downstream computing nodes.

Specifically, the current computing node may compare the data ratios of the downstream computing nodes with each other, thereby determining the magnitude relationship between the data ratios.

S806: Perform load balancing on the downstream computing nodes based on the magnitude relationship.

Specifically, the current computing node may decrease flow data sent by a downstream computing node of a larger data ratio, and increase flow data sent by a downstream computing node of a smaller data ratio. Herein, "larger" and "smaller" mean a relative magnitude relationship of the data ratios corresponding to all the downstream computing nodes of the current computing node. For example, the current computing node may decrease flow data sent by a downstream computing node of a largest data ratio, and increase flow data sent by a downstream computing node of a smallest data ratio.

Figure 9:
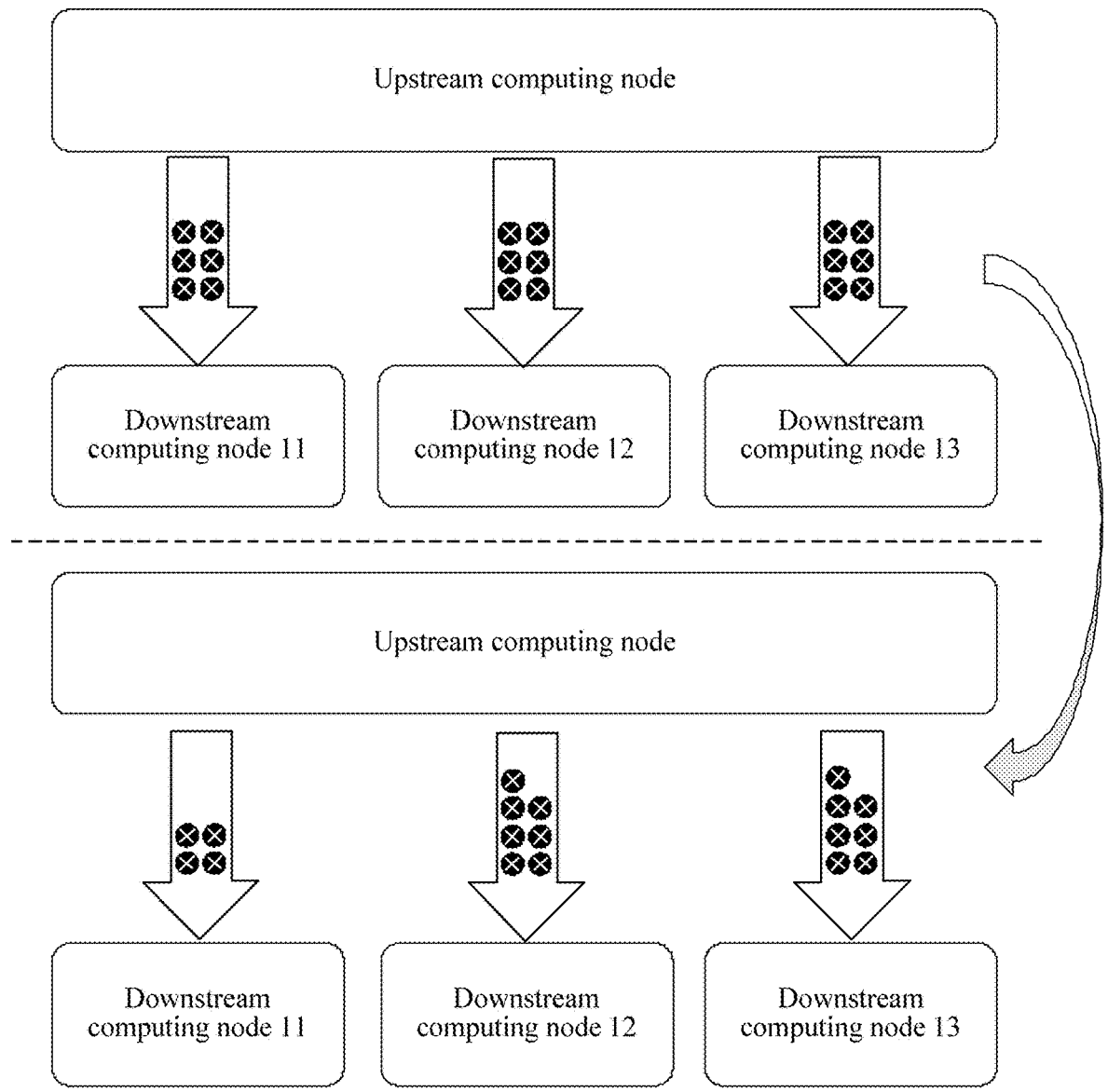
FIG. 9 is a schematic diagram that an upstream computing node performs load balancing on downstream computing nodes by adjusting a flow direction of flow data according to an embodiment.

For example, referring to FIG. 9, it is assumed that data volumes of flow data initially sent to downstream computing nodes 11, 12 and 13 by the upstream computing node are the same. When the upstream computing node periodically detects the downstream computing nodes, the upstream computing node finds that data ratios of the downstream computing nodes 11, 12 and 13 are 0.5, 0.2 and 0.2 in sequence, and a data ratio of the computing node 11 is greater than data ratios of the computing nodes 12 and 13. The upstream computing node may decrease a data volume of flow data sent to the computing node 11, and distribute a decreased data volume of flow data sent to the computing node 11 to the computing nodes 12 and 13.

In this embodiment, load balancing is performed on the downstream computing nodes based on the magnitude relationship between the data ratios of the downstream computing nodes, and this can further reduce a probability that the back pressure problem occurs.

It should be understood that steps in flowcharts of the FIG. 3, FIG. 4, FIG. 7 and FIG. 8 are displayed in sequence based on indication of arrows, but the steps are not necessarily performed in sequence based on a sequence indicated by the arrows. Unless otherwise definitely described in the specification, performing of the steps does not have a strict sequence limitation, and the steps may be performed in another sequence. In addition, at least some steps in FIG. 3, FIG. 4, FIG. 7 and FIG. 8 may include a plurality of sub-steps or a plurality of stages. The sub-steps or the stages are not necessarily performed at a same moment, and instead may be performed at different moments. A performing sequence of the sub-steps or the stages is not necessarily performing in sequence, and instead may be performing in turn or alternately with another step or at least some of sub-steps or stages of the another step.

Figure 10:
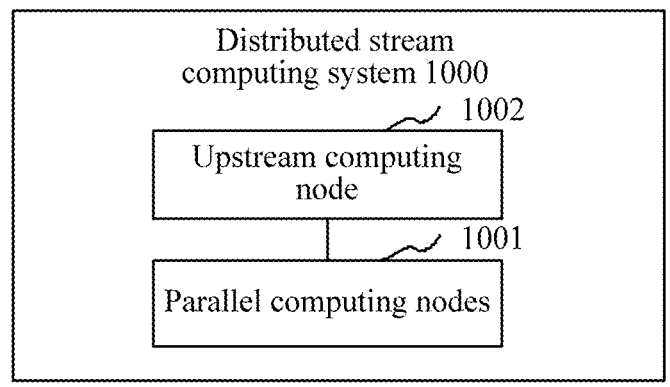
FIG. 10 is a structural block diagram of a distributed stream computing system according to an embodiment.

FIG. 10 is a structural block diagram of a distributed stream computing system 1000 according to an embodiment. Referring to FIG. 10, the system includes parallel computing nodes 1001 and an upstream computing node 1002 corresponding to the parallel computing nodes 1001.

The upstream computing node 1002 is configured to send flow data to the parallel computing nodes 1001.

The parallel computing nodes 1001 are configured to: receive the flow data sent by the upstream computing node 1002 and store the flow data into a flow data pool, flow data in the flow data pool being consumed when stream computing is locally performed on the flow data in the flow data pool; collect a data ratio of the flow data in the flow data pool to a total capacity of the flow data pool; perform an operation of adding a mark and increase a first threshold, if the collected data ratio is greater than or equal to the first threshold; and perform an operation of deleting the mark and decrease the first threshold, if the collected data ratio is less than or equal to a second threshold, where the second threshold is less than the first threshold.

The upstream computing node 1002 is configured to decrease a flow data sending rate based on the added mark, and increase the flow data sending rate based on the deleted mark.

The distributed stream computing system 1000 uses the relatively high first threshold and the relatively low second threshold, when the data ratio is greater than or equal to the first threshold, it indicates that the back pressure problem may be caused, and in this case, the operation of adding the mark is performed, so that the upstream computing node decreases the flow data sending rate, thereby relieving data pressure. When the data ratio is less than or equal to the second threshold, it indicates that current data pressure is small, the possibility of generating the back pressure problem is quite small, and the operation of deleting the mark is performed, so that the upstream computing node increases the flow data sending rate, thereby improving the efficiency of the stream computing.

In an embodiment, the parallel computing nodes 1001 are further configured to: increase the first threshold if the collected data ratio is greater than or equal to the first threshold; and decrease the first threshold if the collected data ratio is less than or equal to the second threshold.

In this embodiment, the first threshold uses a dynamic value to adapt to a natural fluctuation of flow data, and the first threshold is increased when the data ratio is greater than or equal to the first threshold to decrease a probability that the data ratio reaches the first threshold later. By increasing and decreasing the first threshold, a data rush hour can be dealt with, a layer of cushion is increased for generation of the back pressure problem, the operation is allowed under a relatively high first threshold and relatively large data pressure in the data rush hour, and a large quantity of computing nodes are prevented from generating the back pressure problem in the data rush hour to reduce time validity of the stream computing.

In an embodiment, the parallel computing nodes 1001 synchronously increase the second threshold when increasing the first threshold; and the parallel computing nodes 1001 synchronously decrease the second threshold when decreasing the first threshold.

In this embodiment, the first threshold and the second threshold are synchronously adjusted, and the first threshold and the second threshold are increased when the data ratio is greater than or equal to the first threshold, to decrease a probability that the data ratio is greater than or equal to the first threshold later; and the first threshold and the second threshold are decreased when the data ratio is less than or equal to the second threshold, to decrease a probability that the data ratio is less than or equal to the second threshold later. The operation is allowed under the relatively large data pressure in the data rush hour, the efficiency of the stream computing in the data rush hour is ensured; and the first threshold and the second threshold can be adjusted backwards in time when the data rush hour transitions to a normal state, to adaptively adjust a back pressure processing policy under different data pressure.

In an embodiment, the parallel computing nodes 1001 are further configured to: increase the first threshold, reset a time ratio of the data ratio greater than or equal to the first threshold in a fixed time period, and perform the operation of adding the mark, if the collected data ratio is greater than or equal to the first threshold, and the time ratio is greater than or equal to a preset ratio; and perform the operation of adding the mark, if the collected data ratio is greater than or equal to the first threshold, and the time ratio of the data ratio greater than or equal to the first threshold in the fixed time period is less than the preset ratio.

In this embodiment, when the time ratio of the data ratio greater than or equal to the first threshold in the fixed time period is greater than or equal to the preset ratio, it indicates that the current computing node has relatively large data pressure in the time period as a whole, and the data rush hour may be accurately determined, thereby adjusting the first threshold to adapt to the data rush hour and resetting the time ratio to prepare for next determining. When the time ratio of the data ratio greater than or equal to the first threshold in the fixed time period is less than the preset ratio, it indicates that data pressure in the time period as a whole is not quite large, only the operation of adding the mark is performed, and the first threshold does not need to be adjusted.

In an embodiment, the parallel computing nodes 1001 are further configured to: decrease the first threshold, reset the time ratio, and perform the operation of deleting the mark, if the collected data ratio is less than or equal to the second threshold, and the first threshold is already increased; and perform the operation of deleting the mark, if the collected data ratio is less than or equal to the second threshold, and the first threshold is not increased.

In this embodiment, when the collected data ratio is less than or equal to the second threshold, data pressure is relatively small, and the operation of deleting the mark needs to be performed. If the first threshold is already increased, the first threshold needs to be decreased to adapt a case in which the data pressure is relatively small; and if the first threshold is not increased, the first threshold is maintained to prevent the efficiency of stream computing from being affected due to an excessively low first threshold. The first threshold is decreased, the time ratio needs to be reset, and the time ratio of the data ratio greater than or equal to the first threshold in the fixed time period is re-collected.

In an embodiment, the upstream computing node 1002 is further configured to increase a flow data sending time interval to decrease the flow data sending rate; and the upstream computing node 1002 is further configured to decrease the flow data sending time interval to increase the flow data sending rate. The flow data sending time interval is in positive correlation with average time consumption for a single piece of flow data.

In this embodiment, the upstream computing node increases the flow data sending time interval to decrease the flow data sending rate; and decreases the flow data sending time interval to increase the flow data sending rate. In addition, the flow data sending time interval is in positive correlation with the average time consumption for the single piece of flow data. In this way, precise control on the flow data sending rate can be implemented.

In an embodiment, the upstream computing node 1002 is further configured to decrease a current flow data sending rate if the flow data sending rate is greater than or equal to a preset value when the parallel computing nodes 1001 perform the operation of adding the mark; and the upstream computing node 1002 is further configured to increase, when the parallel computing nodes 1001 perform the operation of adding the mark, if the current flow data sending rate of the upstream computing node 1002 is less than the preset value, and if a quantity ratio of a computing node performing the operation of adding the mark to a set of the parallel computing nodes 1001 reaches a preset ratio, the quantity of the parallel computing nodes 1001.

Figure 11:
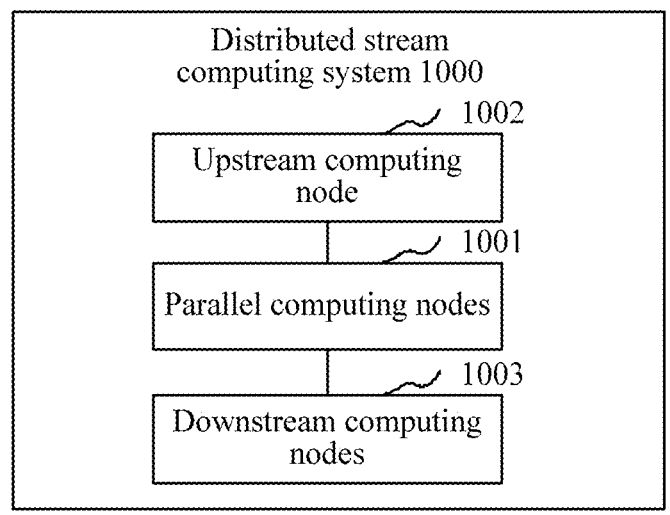
FIG. 11 is a structural block diagram of a distributed stream computing system according to another embodiment.

FIG. 11 is a structural block diagram of a distributed stream computing system 1000 according to another embodiment. Referring to FIG. 11, the system 1000 further includes downstream computing nodes 1003 corresponding to the parallel computing nodes 1001, configured to collect a data ratio of flow data in a flow data pool of each downstream computing node to a total capacity of the corresponding flow data pool; the parallel computing nodes 1001 are further configured to obtain a data ratio of each downstream computing node 1003 of the parallel computing nodes 1001; determine a magnitude relationship between the obtained data ratios of the downstream computing nodes 1003; and perform load balancing on the downstream computing nodes 1003 based on the magnitude relationship.

In this embodiment, load balancing is performed on the downstream computing nodes based on the magnitude relationship between the data ratios of the downstream computing nodes, and this can further reduce a probability that the back pressure problem occurs.

In an embodiment, the parallel computing nodes 1001, the upstream computing node 1002, and the downstream computing nodes 1003 may be computing devices or physical units in the computing devices, or may be program code running in the computing devices.

In an embodiment, a computing device is provided. The computing device includes a processor and a memory, the memory stores a computer readable instruction, and the computer readable instruction, when executed by the processor, causes the processor to perform the steps of the processing method based on distributed stream computing in any one of the foregoing embodiments.

In an embodiment, a non-volatile computer readable storage medium is provided, storing a computer readable instruction, and the computer readable instruction, when executed by one or more processors, causes the one or more processors to perform the steps of the processing method based on distributed stream computing in any one of the foregoing embodiments.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments may be performed. Any reference used for the memory, storage, a database or other media in the embodiments provided in this application may include a non-volatile and/or volatile memory. The non-volatile memory may include a ROM (read only memory), a PROM (programmable ROM), an EPROM (electrically programmable ROM), an EEPROM (electrically erasable programmable ROM) or a flash memory. The volatile memory may include a RAM or an external cache. By way of illustration and not limitation, the RAM may be implemented in various forms, such as an SRAM (static RAM), a DRAM (dynamic RAM), an SDRAM (synchronous DRAM), a DDRSDRAM (double data rate SDRAM), an ESDRAM (enhanced SDRAM), an SLDRAM (synchlink DRAM), a RDRAM (rambus direct RAM), a DRDRAM (direct rambus dynamic RAM) and a RDRAM (rambus dynamic RAM).

Various technical features in the foregoing embodiments may be combined randomly. For ease of description, possible combinations of the various technical features in the foregoing embodiments are not all described. However, the combinations of the technical features should be considered as falling within the scope recorded in this specification provided that the combinations of the technical features are compatible with each other.

The foregoing embodiments only describe several implementations of this application, which are described specifically and in detail, and therefore cannot be construed as a limitation to the patent scope of the present disclosure. It should be noted that, a person of ordinary skill in the art may further make various changes and improvements without departing from the ideas of this application, which shall all fall within the protection scope of this application. Therefore, the protection scope of the patent of this application shall be subject to the appended claims.

What is claimed is:

1. A processing method based on distributed stream computing, performed on a computing device acting as a downstream computing node and having one or more processors and memory storing a plurality of programs to be executed by the one or more processors, the method comprising:

receiving, at the downstream computing node, flow data sent by an upstream computing node;

storing, at the downstream computing node, the flow data into a flow data pool, flow data in the flow data pool being consumed when stream computing is locally performed on the flow data in the flow data pool;

collecting, at the downstream computing node, a data ratio of the flow data in the flow data pool to a total capacity of the flow data pool;

performing, at the downstream computing node, an operation of adding a mark, in accordance with a determination that the collected data ratio is greater than or equal to a first threshold, the operation of adding the mark being detected by the upstream computing node to decrease a flow data sending rate towards the downstream computing node and increasing, at the downstream computing node, the first threshold within an adjustment range of the first threshold when the collected data ratio is greater than or equal to the first threshold; and performing, at the downstream computing node, an operation of deleting the mark, in accordance with a determination that the collected data ratio is less than or equal to a second threshold, the second threshold being less than the first threshold, and the operation of deleting the mark being detected by the upstream computing node to increase the flow data sending rate towards the downstream computing node and decreasing, at the downstream computing node, the first threshold within the adjustment range of the first threshold when the collected data ratio is less than or equal to the second threshold.

2. The method according to claim 1, wherein the second threshold is synchronously increased within an adjustment range of the second threshold when the first threshold is increased; and the second threshold is synchronously decreased within the adjustment range of the second threshold when the first threshold is decreased.

3. The method according to claim 1, wherein the operation of performing, at the downstream computing node, in accordance with a determination that the collected data ratio is greater than or equal to a first threshold, an operation of adding a mark comprises:

increasing the first threshold, resetting a time ratio of the data ratio greater than or equal to the first threshold in a fixed time period, and performing the operation of adding the mark, when the collected data ratio is greater than or equal to the first threshold, and the time ratio is greater than or equal to a preset ratio; and performing, at the downstream computing node, the operation of adding the mark, if the collected data ratio is greater than or equal to the first threshold, and the time ratio of the data ratio greater than or equal to the first threshold in the fixed time period is less than the preset ratio.

4. The method according to claim 3, wherein the operation of performing, at the downstream computing node, an operation of deleting the mark, in accordance with a determination that the collected data ratio is less than or equal to a second threshold comprises:

decreasing the first threshold, resetting the time ratio, and performing the operation of deleting the mark, if the collected data ratio is less than or equal to the second threshold, and the first threshold is already increased; and performing the operation of deleting the mark, if the collected data ratio is less than or equal to the second threshold, and the first threshold is not increased.

5. The method according to claim 1, further comprising:
increasing, at the downstream computing node, a flow data sending time interval by the upstream computing node when decreasing the flow data sending rate, the flow data sending time interval being in positive correlation with average time consumption for a single piece of flow data; and decreasing, at the downstream computing node, the flow data sending time interval by the upstream computing node when increasing the flow data sending rate.

6. The method according to claim 1, further comprising:
decreasing, at the downstream computing node, a current flow data sending rate of the upstream computing node by the upstream computing node if the flow data sending rate is greater than or equal to a preset value when performing the operation of adding the mark; and adding, at the downstream computing node, when performing the operation of adding the mark, if the current flow data sending rate of the upstream computing node is less than the preset value, and if a quantity ratio of a computing node performing the operation of adding the mark to a current computing node and a computing node parallel to the current computing node reaches a preset ratio, the computing node parallel to the current computing node.

7. The method according to claim 1, further comprising:
obtaining, at the downstream computing node, a data ratio of flow data in a flow data pool of each downstream computing node of a current computing node to a total capacity of the corresponding flow data pool;

determining, at the downstream computing node, a magnitude relationship between the obtained data ratios of the downstream computing nodes; and performing, at the downstream computing node, load balancing on the downstream computing nodes based on the magnitude relationship.

8. A computing device acting as a downstream computing node, comprising:

one or more processors;

memory; and a plurality of programs stored in the memory that, when executed by the one or more processors, cause the computing device to perform a plurality of operations including:

receiving, at the downstream computing node, flow data sent by an upstream computing node;

storing, at the downstream computing node, the flow data into a flow data pool, flow data in the flow data pool being consumed when stream computing is locally performed on the flow data in the flow data pool;

collecting, at the downstream computing node, a data ratio of the flow data in the flow data pool to a total capacity of the flow data pool;

performing, at the downstream computing node, an operation of adding a mark, in accordance with a determination that the collected data ratio is greater than or equal to a first threshold, the operation of adding the mark being detected by the upstream computing node to decrease a flow data sending rate towards the downstream computing node and increasing, at the downstream computing node, the first threshold within an adjustment range of the first threshold when the collected data ratio is greater than or equal to the first threshold; and performing, at the downstream computing node, an operation of deleting the mark, in accordance with a determination that the collected data ratio is less than or equal to a second threshold, the second threshold being less than the first threshold, and the operation of deleting the mark being detected by the upstream computing node to increase the flow data sending rate towards the downstream computing node and decreasing, at the downstream computing node, the first threshold within the adjustment range of the first threshold when the collected data ratio is less than or equal to the second threshold.

9. The computing device according to claim 8, wherein the second threshold is synchronously increased when the first threshold is increased; and the second threshold is synchronously decreased when the first threshold is decreased.

10. The computing device according to claim 8, wherein the operation of performing, at the downstream computing nodein accordance with a determination that the collected data ratio is greater than or equal to a first threshold, an operation of adding a mark comprises:

increasing the first threshold, resetting a time ratio of the data ratio greater than or equal to the first threshold in a fixed time period, and performing the operation of adding the mark, when the collected data ratio is greater than or equal to the first threshold, and the time ratio is greater than or equal to a preset ratio; and performing, at the downstream computing node, the operation of adding the mark, if the collected data ratio is greater than or equal to the first threshold, and the time ratio of the data ratio greater than or equal to the first threshold in the fixed time period is less than the preset ratio.

11. The computing device according to claim 10, wherein the operation of performing, at the downstream computing node, an operation of deleting the mark, in accordance with a determination that the collected data ratio is less than or equal to a second threshold comprises:

decreasing the first threshold, resetting the time ratio, and performing the operation of deleting the mark, if the collected data ratio is less than or equal to the second threshold, and the first threshold is already increased; and performing the operation of deleting the mark, if the collected data ratio is less than or equal to the second threshold, and the first threshold is not increased.

12. The computing device according to claim 8, wherein the plurality of operations include:

increasing, at the downstream computing node, a flow data sending time interval by the upstream computing node when decreasing the flow data sending rate, the flow data sending time interval being in positive correlation with average time consumption for a single piece of flow data; and decreasing, at the downstream computing node, the flow data sending time interval by the upstream computing node when increasing the flow data sending rate.

13. The computing device according to claim 8, wherein the plurality of operations include:

decreasing, at the downstream computing node, a current flow data sending rate of the upstream computing node by the upstream computing node if the flow data sending rate is greater than or equal to a preset value when performing the operation of adding the mark; and adding, at the downstream computing node, when performing the operation of adding the mark, if the current flow data sending rate of the upstream computing node is less than the preset value, and if a quantity ratio of a computing node performing the operation of adding the mark to a current computing node and a computing node parallel to the current computing node reaches a preset ratio, the computing node parallel to the current computing node.

14. The computing device according to claim 8, wherein the plurality of operations include:

obtaining, at the downstream computing node, a data ratio of flow data in a flow data pool of each downstream computing node of a current computing node to a total capacity of the corresponding flow data pool;

determining, at the downstream computing node, a magnitude relationship between the obtained data ratios of the downstream computing nodes; and performing, at the downstream computing node, load balancing on the downstream computing nodes based on the magnitude relationship.

15. A non-transitory computer readable storage medium, storing a plurality of programs that, when executed by a computing device acting as a downstream computing node and having one or more processors, cause the computing device to perform a plurality of operations including:

receiving, at the downstream computing node, flow data sent by an upstream computing node;

storing, at the downstream computing node, the flow data into a flow data pool, flow data in the flow data pool being consumed when stream computing is locally performed on the flow data in the flow data pool;

collecting, at the downstream computing node, a data ratio of the flow data in the flow data pool to a total capacity of the flow data pool;

performing, at the downstream computing node, an operation of adding a mark, in accordance with a determination that the collected data ratio is greater than or equal to a first threshold, the operation of adding the mark being detected by the upstream computing node to decrease a flow data sending rate towards the downstream computing node and increasing, at the downstream computing node, the first threshold within an adjustment range of the first threshold when the collected data ratio is greater than or equal to the first threshold; and performing, at the downstream computing node, an operation of deleting the mark, in accordance with a determination that the collected data ratio is less than or equal to a second threshold, the second threshold being less than the first threshold, and the operation of deleting the mark being detected by the upstream computing node to increase the flow data sending rate towards the downstream computing node and decreasing, at the downstream computing node, the first threshold within the adjustment range of the first threshold when the collected data ratio is less than or equal to the second threshold.

16. The non-transitory computer readable storage medium according to claim 15, wherein the second threshold is synchronously increased when the first threshold is increased; and the second threshold is synchronously decreased when the first threshold is decreased.

17. The non-transitory computer readable storage medium according to claim 15, wherein the operation of performing, at the downstream computing node, in accordance with a determination that the collected data ratio is greater than or equal to a first threshold, an operation of adding a mark comprises:

increasing the first threshold, resetting a time ratio of the data ratio greater than or equal to the first threshold in a fixed time period, and performing the operation of adding the mark, when the collected data ratio is greater than or equal to the first threshold, and the time ratio is greater than or equal to a preset ratio; and performing the operation of adding the mark, if the collected data ratio is greater than or equal to the first threshold, and the time ratio of the data ratio greater than or equal to the first threshold in the fixed time period is less than the preset ratio.

* * * * *